United States Patent
Cho et al.

(10) Patent No.: US 9,587,613 B2
(45) Date of Patent: Mar. 7, 2017

(54) STARTING AND GENERATING SYSTEM FOR HYBRID VEHICLE

(71) Applicant: Hyundai Motor Company, Seoul (KR)

(72) Inventors: Sung Tae Cho, Gyeonggi-do (KR); Kyung Shin Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/924,017

(22) Filed: Oct. 27, 2015

(65) Prior Publication Data
US 2016/0327004 A1   Nov. 10, 2016

(30) Foreign Application Priority Data

May 6, 2015   (KR) .......................... 10-2015-0063122

(51) Int. Cl.
| | |
|---|---|
| *B60K 6/365* | (2007.10) |
| *F02N 11/04* | (2006.01) |
| *F02N 11/08* | (2006.01) |
| *B60L 11/12* | (2006.01) |
| *B60L 11/14* | (2006.01) |
| *H02P 9/08* | (2006.01) |

(52) U.S. Cl.
CPC .............. *F02N 11/04* (2013.01); *B60L 11/12* (2013.01); *B60L 11/14* (2013.01); *F02N 11/08* (2013.01); *F02N 11/0851* (2013.01); *H02P 9/08* (2013.01); *Y10S 903/904* (2013.01)

(58) Field of Classification Search
CPC ....................................................... B60K 6/20
USPC ........................................... 180/65.21; 290/34
See application file for complete search history.

(56) References Cited

U.S. PATENT DOCUMENTS

| | | | | |
|---|---|---|---|---|
| 6,396,165 B1* | 5/2002 | Nagano | ................. | H04L 12/403 307/10.1 |
| 6,555,927 B1* | 4/2003 | Suzuki | ................... | B60K 6/365 290/34 |

(Continued)

FOREIGN PATENT DOCUMENTS

| | | |
|---|---|---|
| JP | 2000-142146 A | 5/2000 |
| JP | 2000-154741 A | 6/2000 |

(Continued)

*Primary Examiner* — Joseph Waks
(74) *Attorney, Agent, or Firm* — Mintz Levin Cohn Ferris Glovsky and Popeo, P.C.; Peter F. Corless

(57) ABSTRACT

A starting and generating system for a hybrid vehicle is provided. The system includes a starter-generator which transmits rotational force to the engine to start the engine when the starter-generator is operated as a motor, and is operated as a generator by receiving rotational force of the engine. A motor-generator is operated as a generator by receiving rotational force of the engine and a planetary gear mechanism connects the engine, the starter-generator, and the motor-generator to transmit rotational force between the engine, the starter-generator, and the motor-generator. Additionally, a first brake and a second brake selectively operate rotating elements, which are connected to the starter-generator and the motor-generator among the rotating elements of the planetary gear mechanism, as a fixed element. A controller specifically operates the starter-generator, the motor-generator, the first brake, and the second brake.

10 Claims, 9 Drawing Sheets

(56) References Cited

U.S. PATENT DOCUMENTS

| | | | | |
|---|---|---|---|---|
| 6,862,511 B1* | 3/2005 | Phillips | ............... | B60K 5/08 |
| | | | | 701/54 |
| 8,500,585 B2* | 8/2013 | Kim | ............... | F16H 3/728 |
| | | | | 475/282 |
| 9,115,681 B2* | 8/2015 | Nakamura | ............... | F02N 11/006 |
| 9,140,201 B2* | 9/2015 | Kato | ............... | B60K 6/48 |
| 9,371,810 B2* | 6/2016 | Creviston | ............... | F02N 15/043 |
| 2001/0022245 A1* | 9/2001 | Rogg | ............... | B60K 6/365 |
| | | | | 180/65.21 |
| 2005/0060076 A1* | 3/2005 | Phillips | ............... | B60K 6/44 |
| | | | | 701/51 |
| 2007/0205029 A1* | 9/2007 | Leone | ............... | B60K 6/365 |
| | | | | 180/65.225 |
| 2011/0053729 A1* | 3/2011 | Parsons | ............... | F16D 41/07 |
| | | | | 475/297 |

FOREIGN PATENT DOCUMENTS

| | | | |
|---|---|---|---|
| JP | 2001-159384 A | | 6/2001 |
| JP | 2006-207388 A | | 8/2006 |
| JP | 2007-237886 A | | 9/2007 |
| JP | 2007-315338 A | | 12/2007 |
| JP | 2008044517 A | * | 2/2008 |
| JP | 2008-056236 A | | 3/2008 |
| KR | 2013-0059830 A | | 6/2013 |

\* cited by examiner

STARTING AND GENERATING SYSTEM FOR HYBRID VEHICLE

BACKGROUND (a) Technical Field

The present invention relates to a starting and generating system for a hybrid vehicle. More particularly, the present invention relates to a starting and generating system for a hybrid vehicle, which may copes with the requirement of a large-capacity motor, and solves a problem regarding a limitation in view of a layout when a single large-capacity motor is used, and a limitation in application of the large-capacity motor due to an increase in load applied to the shaft of the engine (b) Background Art In general, a hybrid vehicle, which is a vehicle that travels using an engine and a motor as driving sources, is an environmentally-friendly vehicle that travels using both energy generated from fossil fuel and electrical energy, thereby reducing exhaust gas and improving fuel efficiency.

FIG. 1 is a view illustrating a configuration of a powertrain of a hybrid vehicle according to the related art, which illustrates a configuration of a powertrain of a transmission-mounted-electric-device (TMED) type in which a drive motor and a transmission are attached. As illustrated in FIG. 1, the configuration of the powertrain of the hybrid vehicle includes an engine 1 and a drive motor 3 which are disposed in series as driving sources for driving a vehicle, an engine clutch 2 which is interposed between the engine 1 and the drive motor 3 to transmit or block power between the engine 1 and the drive motor 3, a transmission 4 which changes power from the engine 1 and the drive motor 3 and transmits the power to a driving shaft 5, and a starter-generator (e.g., integrated starter and generator (ISG) or hybrid starter and generator (HSG)) 6 which is connected with the engine 1 to transmit power.

Particularly, the engine clutch 2 is configured to transmit or block power between the engine 1 and the drive motor 3 while being engaged (lock-up) or disengaged (open). A battery 8, operating as a power source (e.g., electric power source) for the vehicle, is connected to the drive motor 3 and the starter-generator 6 via an inverter 7 to be charged and discharged, and the inverter 7 is configured to convert a direct current (DC) from the battery 8 into a three-phase alternating current (AC) and then apply the three-phase alternating current to the drive motor and the starter-generator to operate the drive motor 3 and the starter-generator 6.

Unlike a general vehicle with an internal combustion engine in which a starter motor and a generator are mounted separately, the starter-generator 6 is a device that performs an integrated function of a starter motor (starter) and a generator (alternator) in the hybrid vehicle. The starter-generator 6 is configured to start the engine 1 by transmitting power to the engine 1 through a belt 9 while being operated, or generate electric power using rotational force transmitted from the engine, and charge the battery 8 with electrical energy produced by the operation of generating electric power. In other words, the engine needs to be started when a mode is changed from an electric vehicle (EV) mode, which is a pure electric vehicle mode in which the hybrid vehicle travels by using power of the drive motor 3, to a hybrid electric vehicle (HEV) mode in which the hybrid vehicle travels using both power of the engine 1 and power of the drive motor 3, and in this case, the starter-generator 6 is used.

Since a pulley 6A of the starter-generator 6 is connected with a crank pulley 1A mounted to a crank shaft (C/S) of the engine 1 through the belt 9 to transmit power, the starter-generator 6 is operated as a motor and is configured to transmit rotational force to the crank shaft through the belt 9, to start the engine. When the engine is being operated, the starter-generator 6 is configured to receive rotational force of the engine 1, that is, rotational force of the crank shaft through the belt 9 and is operated as a generator to produce electrical energy and charge the battery 8.

When the vehicle is stopped (e.g., the vehicle brake is engaged), the starter-generator 6 is operated as a generator and produces electrical energy using rotational force transmitted from the engine 1 through the belt 9, and as a result, energy regeneration for charging the battery 8 is performed. The electrical energy, which is stored in the battery 8 as described above, is used to operate the drive motor 3 to drive the vehicle.

Hereinafter, in the present specification, a configuration, which includes the starter-generator for a hybrid vehicle and a power transmission mechanism that connects the starter-generator and the engine to transmit power between the starter-generator and the engine, is referred to as a starting and generating system for a hybrid vehicle. Meanwhile, the starting and generating system in the related art uses the power transmission mechanism that includes the belt and the pulley as described above, and adopts a power transmission method that connects the engine and the starter-generator with the belt.

However, the belt transmission method has a disadvantage in terms of controllability, and during battery charging for managing a level of a charged state of the battery, deterioration in transmission efficiency due to tension or a slip of the belt (e.g., the occurrence of slips and the like) may cause deterioration in overall efficiency of the vehicle. Particularly, since an operation range of the starter-generator is widened as the function of the starter-generator increases to not only a function of a starter motor for starting engine, but also a function of a series mode in which the starter-generator operates the engine and generates electric power using engine power to operate the drive motor using the electric power, a large-capacity motor is required to be used as the starter-generator.

In the case of a large-sized vehicle (e.g., a truck), an increase in size of the starter-generator and an increase in capacity of the motor are required, but there is difficulty in using a single motor of which the size is increased and coping with the requirement of the large-sized vehicle due to a limitation caused by an increase in lateral loads applied to various types of shafts of the engine and a limitation in terms of a layout of a belt system of the engine.

The above information disclosed in this section is merely for enhancement of understanding the background of the invention and therefore it may contain information that does not form the prior art that is already known in this country to a person of ordinary skill in the art.

SUMMARY

The present invention provides a starting and generating system for a hybrid vehicle, which may improve controllability for predetermined modes such as an engine starting mode, a series driving mode, and a general traveling mode, effectively cope with the requirement for a large-capacity motor, and solve a problem regarding a limitation in view of a layout when a single large-capacity motor is used, or a limitation in application of the large-capacity motor due to an increase in load applied to the shaft of the engine.

In one aspect, the present invention provides a starting and generating system for a hybrid vehicle configured to start an engine and generate electric power by receiving rotational force of the engine in the hybrid vehicle that includes the engine, a drive motor, and an engine clutch disposed to transmit or block power between the engine and the drive motor. Particularly, the starting and generating system may include: a starter-generator configured to transmit rotational force to the engine to start the engine when the starter-generator is operated as a motor, and may be operated as a generator by receiving rotational force of the engine; a motor-generator operated as a generator by receiving rotational force of the engine; a planetary gear mechanism which connects the engine, the starter-generator, and the motor-generator to transmit rotational force between the engine, the starter-generator, and the motor-generator; a first brake and a second brake configured to selectively operate rotating elements, and connected to the starter-generator and the motor-generator among the rotating elements of the planetary gear mechanism, as a fixed element; and a controller configured to operate the starter-generator, the motor-generator, the first brake, and the second brake.

In an exemplary embodiment, among the rotating elements of the planetary gear mechanism, a sun gear may be connected to a rotating shaft of the starter-generator, a ring gear may be connected to a rotating shaft of the motor-generator, and a carrier which integrally couples and supports pinions, may be connected to a rotating shaft of the engine. When the engine is started, the controller may be configured to output a control signal for coupling the second brake connected to the ring gear to operate the ring gear as a fixed element, and a control signal for separating the first brake connected to the sun gear to transmit rotational force of the starter-generator to the engine. The controller may further be configured to output a control signal for separating both of the first brake and the second brake when the engine is stopped and the engine clutch is disengaged.

Additionally, when the vehicle is operated by using rotational force of the engine and the drive motor when the engine is operated and the engine clutch is engaged, the controller may be configured to output a control signal for coupling the first brake connected to the sun gear to operate the sun gear as a fixed element, and a control signal for separating the second brake connected to the ring gear to rotate the motor-generator in a no-load state by rotational force of the engine.

Furthermore, the controller may be configured to perform series driving mode control that operates the engine to operate one or two of the starter-generator and the motor-generator, which are selected, based on an engine speed, as a generator using rotational force of the engine, and operate the drive motor using generated electric power. The controller may be configured to operate the starter-generator as a generator when the engine speed is a predetermined reference speed or less, and operate both of the starter-generator and the motor-generator as generators when the engine speed is greater than the reference speed.

In addition, the controller may be configured to output a control signal for operating the first brake and the second brake so that when the engine speed is a predetermined reference speed or less, a rotating element, which is connected to the starter-generator among the rotating elements of the planetary gear mechanism, is rotated, and a rotating element connected to the motor-generator is operated as a fixed element. The controller may further be configured to output a control signal for operating the first brake and the second brake so that when the engine speed exceeds the reference speed, both of the rotating elements connected to the starter-generator and the motor-generator are rotated.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
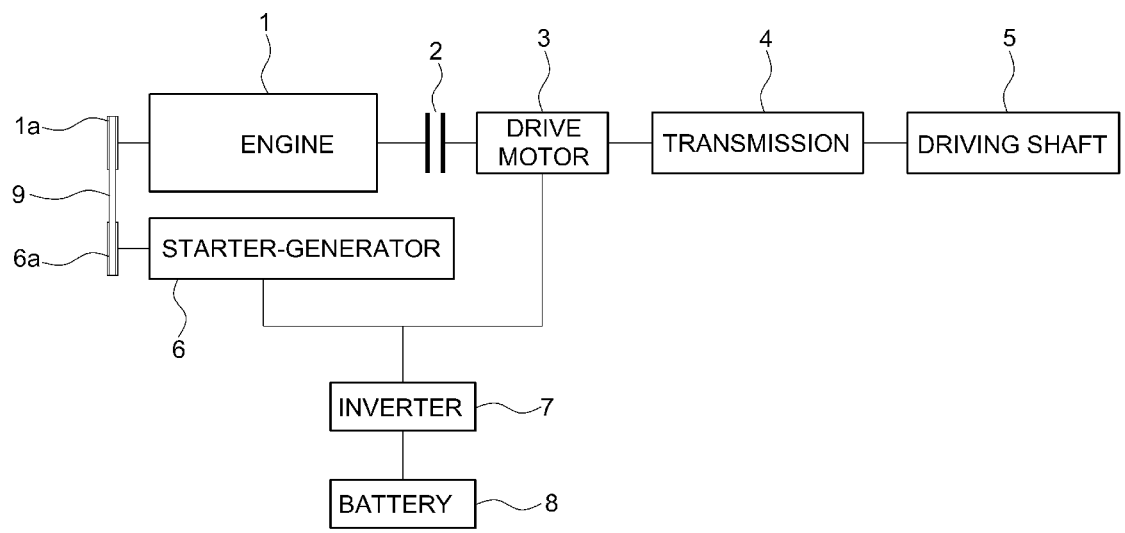
FIG. 1 is a view illustrating a configuration of a powertrain of a hybrid vehicle according to the related art.

Reference numerals set forth in the Drawings include reference to the following elements as further discussed below:

1: engine
2: engine clutch
3: drive motor
4: transmission
5: driving shaft
7: inverter
8: battery
10: planetary gear mechanism
11: sun gear
12: ring gear
13: carrier
14: first brake
15: second brake
21: starter-generator
22: motor-generator It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that those skilled in the art to which the present invention pertains may easily carry out the exemplary embodiment.

Figure 2:
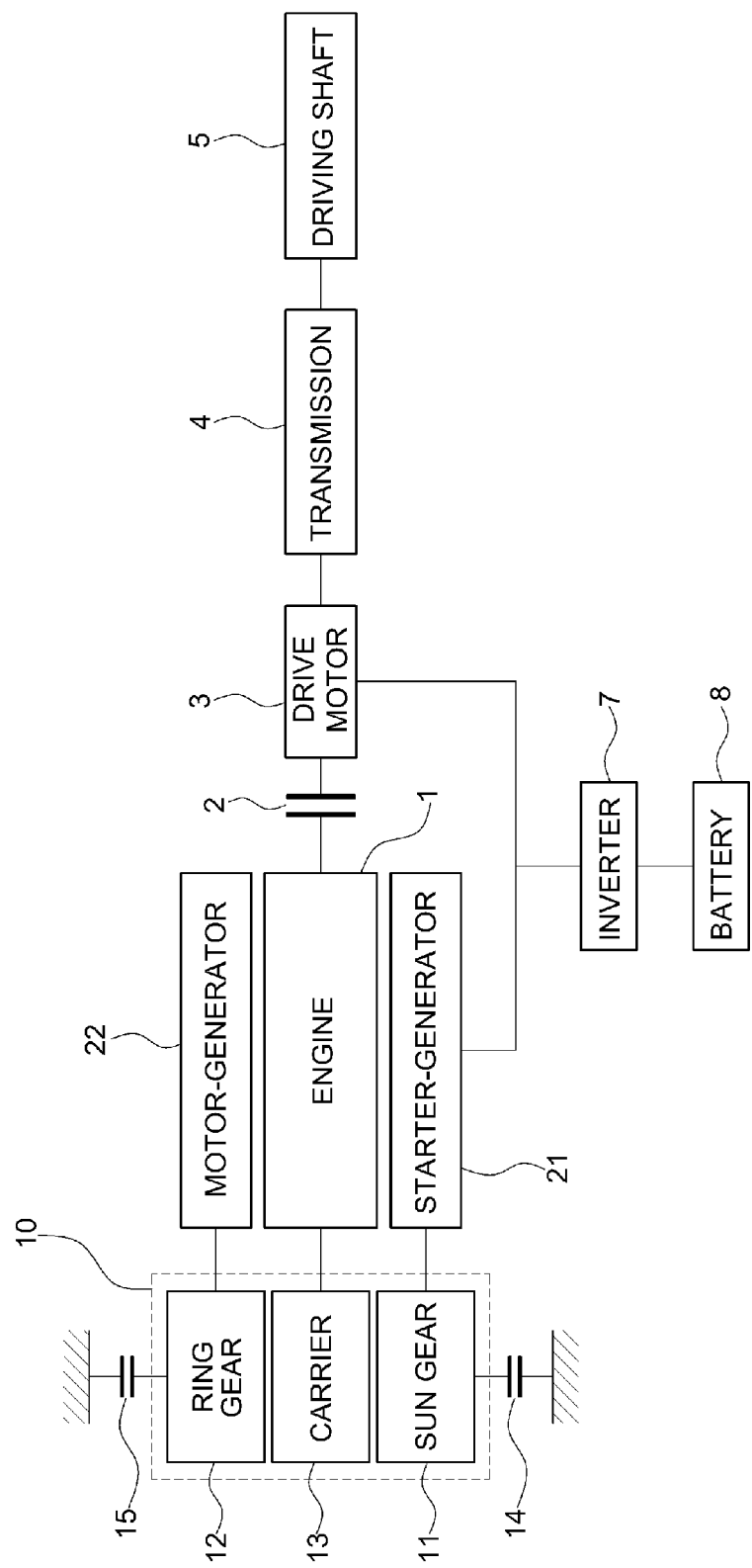
FIG. 2 is a view illustrating a configuration of a powertrain of a hybrid vehicle including a starting and generating system according to an exemplary embodiment of the present invention.

FIG. 2 is a view illustrating a configuration of a starting and generating system and a powertrain of a hybrid vehicle according to an exemplary embodiment of the present invention. As illustrated, in the starting and generating system according to the present invention, a planetary gear mechanism 10 may be used as a power transmission mechanism between an engine 1 and motors 21 and 22 for starting the engine and generating electric power instead of a belt transmission mechanism as used in the related art.

The starting and generating system according to the present invention may include a starter-generator 21 and a motor-generator 22, as small-capacity motors configured to start the engine and generate electric power, connected with the engine 1 to transmit power using the planetary gear mechanism 10. Particularly, both of the two small-capacity motors may be configured to perform integrated functions of a starter motor and a generator instead of a single large-capacity motor. In other words, instead of a large-capacity starter-generator (e.g., large-capacity motor) used in the related art which was applied to meet the requirement for a large capacity, the two small-capacity motors, which may serve as the starter motor and the generator, are provided and used. The use of the two small-capacity motors to start the engine and generate electric power is more advantageous in terms of material costs, production costs, and package configurations than the use of one large-capacity motor (e.g., large-capacity starter-generator in the related art), which has the same capacity as the two motors combined.

When describing the configurations, in the starting and generating system according to the present invention, the planetary gear mechanism 10 may include, like a typical configuration, a sun gear 11, pinions (not illustrated) which externally engage with the sun gear 11, a ring gear 12 which internally engages with the pinion, and a carrier 13 which integrally couples and supports the pinions. In particular, rotating elements of the planetary gear mechanism 10 are the sun gear 11, the ring gear 12, and the carrier 13. The sun gear 11 and the ring gear 12, among the rotating elements, may be connected with a fixed structure within a vehicle by brakes 14 and 15 respectively to serve as elements that are selectively fixed.

Hereinafter, in the present specification, the brake 14 interposed between the sun gear 11 and the fixed structure within the vehicle, is referred to as a first brake, and the brake 15 interposed between the ring gear 12 and the fixed structure within the vehicle, is referred to as a second brake. The carrier 13 may be connected to a rotating shaft of the engine 1 to transmit rotational force between the carrier 13 and the engine 1, and the sun gear 11 may be connected to a rotating shaft of the starter-generator 21 to transmit rotational force between the sun gear 11 and the starter-generator 21.

The ring gear 12 may be connected to a rotating shaft of the motor-generator 22 to transmit rotational force between the ring gear 12 and the motor-generator 22. The starter-generator 21 and the motor-generator 22 may be connected to a battery 8 in the vehicle via an inverter 7 to be charged and discharged, and when the starter-generator 21 and the motor-generator 22 are operated as generators by receiving engine power through the planetary gear mechanism 10, electrical energy produced by the generation may be transferred to the battery 8 through the inverter 7 and may then be stored in the battery 8 (battery charging), or may be used to operate the drive motor 3.

When a direct current (DC) from the battery 8 is converted into a three-phase alternating current (AC), and then the three-phase alternating current is applied to the starter-generator 21 (battery discharging), the starter-generator 21 may be operated to transmit power to the engine 1 via the planetary gear mechanism 10 to thus start the engine 1. In particular, as will be described below, one of the two motors, that is, the starter-generator 21 may be used to start the engine 1. In the configuration of the powertrain illustrated in FIG. 2, since an engine clutch 2 and a transmission 4 between the drive motor 3, the engine 1, and the drive motor 3 are not different from those in the related art, a description thereof will be omitted.

The configuration of the starting and generating system according to the exemplary embodiment of the present invention has been described above. As described above, the starting and generating system according to the exemplary embodiment may include the starter-generator 21 and the motor-generator 22, the planetary gear mechanism 10 interposed between the engine 1, the starter-generator 21, and the motor-generator 22 to transmit power therebetween, and the first brake 14 and the second brake 15 interposed between the planetary gear mechanism 10 and the fixed structure and serve as friction members.

In the configuration of the starting and generating system, the operations of the starter-generator 21 and the motor-generator 22 and the operations of the first brake 14 and the second brake 15 may be executed based on a control signal from a controller (not illustrated). Particularly, the controller may be a single integrated control element, but the respective constituent elements of the starting and generating system may be executed based on predetermined control modes by cooperative control from a plurality of controllers.

Figure 3:
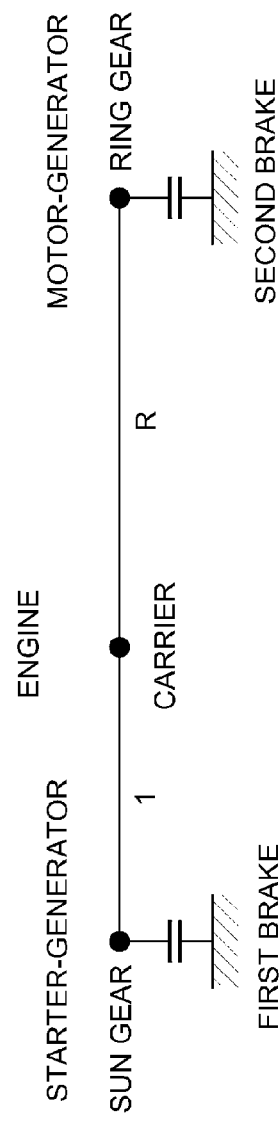
FIGS. 3 to 7 are views for explaining a control mode of the starting and generating system according to the exemplary embodiment of the present invention.

The control modes of the starting and generating system may include a stopping mode, an engine starting mode, a series driving mode, and a general traveling mode. First, the stopping mode may be a mode when the vehicle is stopped, which is a condition in which the engine is stopped, regenerative braking is performed, or the vehicle coasts, and may be a mode performed when the engine 1 is separated from other driving systems (e.g., the drive motor and the transmission), that is, the engine clutch 2 is disengaged. As illustrated in FIG. 3, in the stopping mode, the engine 1, the starter-generator 21, and the motor-generator 22 may be operated to be in a stopped state, and the first brake 14 and the second brake 15 may be operated to be in a separated state.

Figure 4:
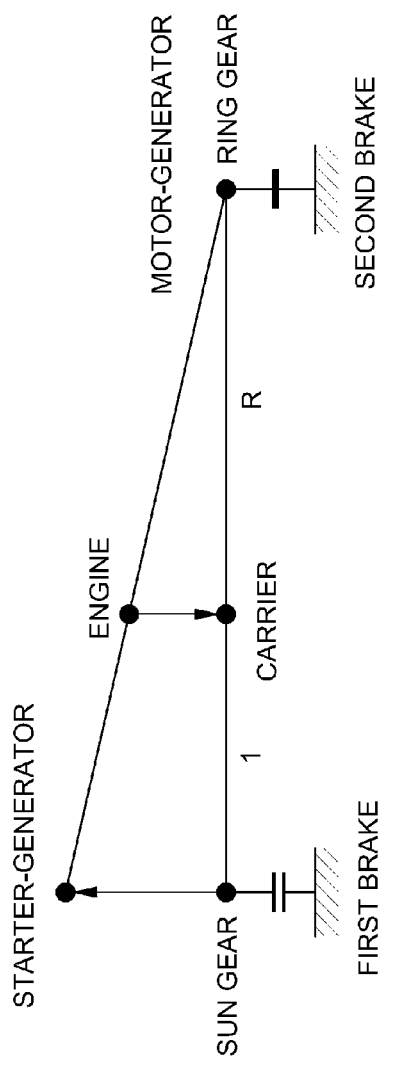

Further, FIG. 4 is a view for explaining the engine starting mode, that is, the control mode for starting the engine. The second brake 15 and the first brake 14 may be to be in a coupled state and a separated state, respectively, to start the engine, and the starter-generator 21 may be operated to start the engine 1. In the engine starting mode, since the second brake 15 is coupled (e.g., is in a coupled state), the ring gear 12 connected to the second brake 15 becomes a fixed element, the sun gear 11 becomes an input element, and the carrier 13 becomes an output element.

Therefore, when the starter-generator 21 is operated, driving power may be transmitted to the engine 1 via the sun gear 11, the pinions, and the carrier 13, thereby starting the engine. In particular, torque supplied to the engine and speed may be determined by the planetary gear mechanism based on the following equations.

Torque: Torque supplied to Engine=$(1+R)\times$Starter-generator Torque

Speed: Engine Speed=$1/(1+R)\times$Starter-generator Speed wherein, R indicates a gear ratio (reduction ratio) of the ring gear and the sun gear, that is, the number of teeth of the ring gear/the number of teeth of the sun gear.

Figure 5:
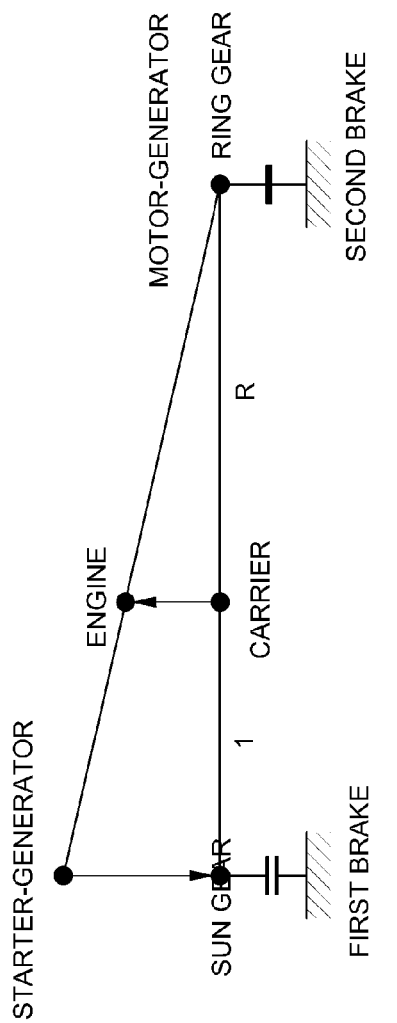

Moreover, FIG. 5 is a view for explaining the series driving mode in which the starter-generator is operated to generate electric power for the purpose of series driving. In particular, the series driving may be a mode in which the engine 1 is operated to transmit engine power to the starter-generator and the motor-generator via the planetary gear mechanism 10, to operate the starter-generator and the motor-generator to generate electric power, and at this time, the drive motor 3 may be driven by electric power produced by the starter-generator and the motor-generator.

In the present invention, the series driving mode may include two modes, that is, a first series driving mode and a second series driving mode, and FIG. 5 illustrates the first series driving mode. The first series driving mode is a control mode performed when the series driving is performed in a region within a range of an operating speed of the starter-generator 21. The second brake 15 may be operated to be in a coupled state, the first brake 14 may be operated to be a separated state, the starter-generator 21 may be operated to generate electric power, and the motor-generator 22 may be operated to be in a stopped state, in a state in which the engine 1 is started and then operated.

In the first series driving mode, since the second brake 15 is coupled (e.g., is in a coupled state), the ring gear 12 connected to the second brake 15 becomes a fixed element, the carrier 13 becomes an input element, and the sun gear 11 becomes an output element. Therefore, in a state in which the engine 1 is operated, engine power may be transmitted to the starter-generator 21 via the carrier 13, the pinions, and the sun gear 11, and the starter-generator 21, configured to receive the engine power, generate electric power to produce electrical energy, and as a result, the battery 8 may be charged or the drive motor 3 may be operated by electric power generated by the starter-generator 21. In particular, engine torque for electric power generation and an engine speed may be determined by the planetary gear mechanism based on the following equations.

Figure 6:
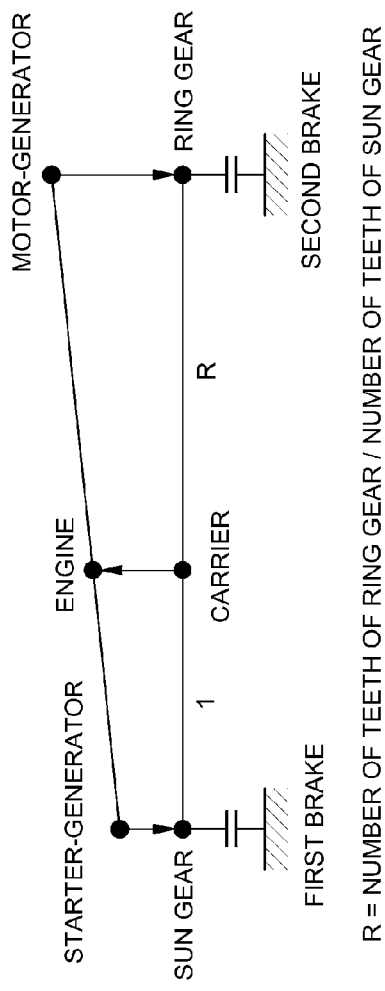

Torque: Engine Torque for Electric Power Generation=$(1+R)\times$Starter-generator Torque Speed: Engine Speed=$1/(1+R)\times$Starter-generator Speed Furthermore, FIG. 6 illustrates the second series driving mode, that is, the series driving mode in which the starter-generator may be operated to generate electric power for the purpose of the series driving. The first series driving mode may be performed when the engine speed is a predetermined reference speed or less, and when the engine speed exceeds the reference speed, the second series driving mode may be performed.

The second series driving mode is the control mode performed when output is required to be equal to or greater than the amount of output of the starter-generator 21. When the engine 1 is started and then operated, the first brake 14 and the second brake 15 may be separated, and both of the starter-generator 21 and the motor-generator 22 may be configured to generate electric power. In the second series driving mode, when the first brake 14 and the second brake 15 are separated, the carrier 13 becomes an input element, and the sun gear 11, and the ring gear 12 become output elements.

Therefore, when the engine 1 is operated, engine power may be transmitted to the starter-generator 21 and the motor-generator 22 simultaneously via the carrier 13, the pinions, the sun gear 11, and the ring gear 12, and both of the starter-generator 21 and the motor-generator 22, configured to receive the engine power, generate electric power to produce electrical energy, and as a result, the battery 8 may be charged or the drive motor 3 may be operated by the electric power generated by the starter-generator 21 and the motor-generator 22. In particular, engine torque for electric power generation and an engine speed may be determined by the planetary gear mechanism based on the following equations.

Torque: Engine Torque for Electric Power Generation=Starter-generator Torque+Motor-generator Torque Speed: Engine Speed=$R/(1+R)\times$Motor-generator Speed+$1/(1+R)\times$Starter-generator Speed As described above, the motor, which provides driving torque to start the engine in the engine starting mode, may be the starter-generator, and in the series driving mode, output for electric power generation may be primarily satisfied with the starter-generator (e.g., first series driving mode), and when the output for electric power generation is insufficient, the motor-generator may be additionally used (e.g., second series driving mode).

Figure 7:
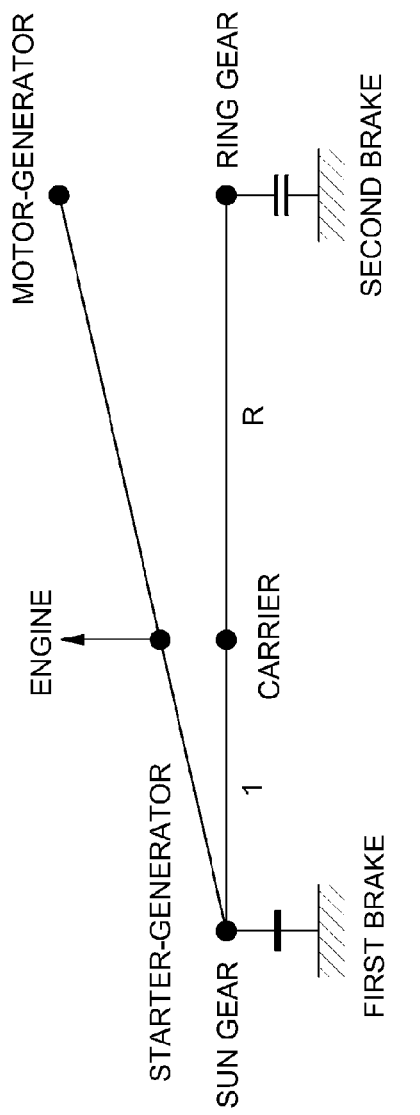

FIG. 7 is a view for explaining the general traveling mode. The general traveling mode is a mode in which the vehicle may be operated using driving power of the engine 1 and the drive motor 3 when the engine is not operated by the starter-generator 21 and the motor-generator 22. In the general traveling mode, when the engine 1 is operated and the engine clutch 2 is engaged, the first brake 14 may be operated to be in a coupled state, and the second brake 15 may be operated to be in a separated state. In particular, since the first brake 14 is coupled (e.g., in a coupled state), the sun gear 11 becomes a fixed element. The starter-generator 21 connected to the sun gear 11 is in a stopped state, and the motor-generator 22 is not involved in the engine control. In other words, since the second brake 15 is in a separated state, the motor-generator 22 may be configured to remain idle in a no-load state under the restriction on speed by the planetary gear mechanism 10 when engine power is transmitted to the motor-generator 22 via the carrier 13, the pinions, and the ring gear 12. In particular, a relationship between an engine speed and a motor-generator speed may be based on the following equation.

Speed: $(1+R) \times$ Engine Speed $= R \times$ Motor-generator Speed

As described above, the starting and generating system for a hybrid vehicle according to the present invention may be variously operated based on a mode selected from the stopping mode, the engine starting mode, the series driving mode, and the general traveling mode.

The starting and generating system according to the present invention may use the two small-capacity motors for starting the engine and generating electric power, and as a result, it may be possible to more effectively cope with the requirement for a large-capacity motor and solve a problem regarding a limitation in view of a layout when a single large-capacity motor is used, or a limitation in application of the large-capacity motor due to an increase in load applied to the shaft of the engine.

Figure 8:
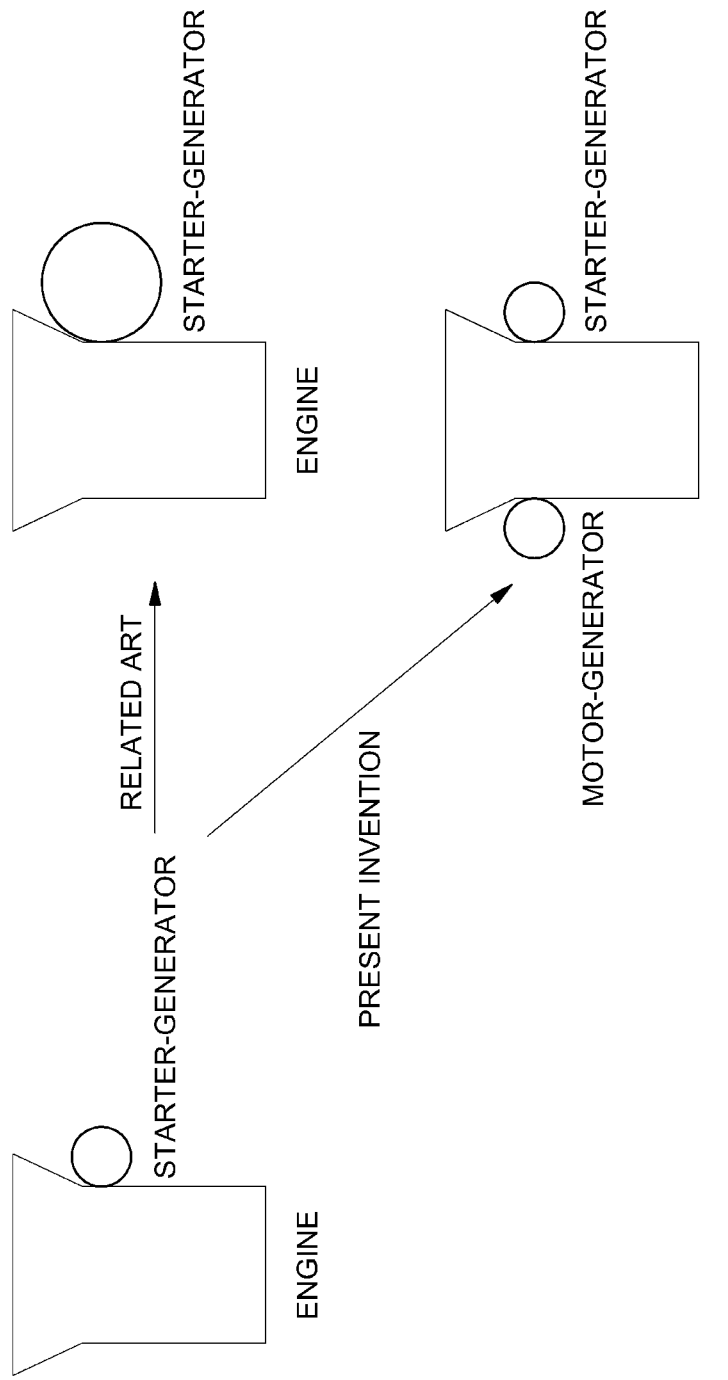
FIGS. 8 and 9 are views for explaining effects of the starting and generating system according to the exemplary embodiment of the present invention.

FIG. 8 is a view for explaining effects of the system according to the present invention. When the specification of the motor for starting the engine and generating electric power is enlarged, the size of the motor is increased, and it may be difficult to configure a layout of an engine belt system, but the problems may be solved by using the two motors with a relatively small capacity as described in the present invention.

For example, in the related art, when the capacity of the motor for starting the engine and generating electric power needs to be enlarged, the size of the motor is also increased as illustrated in FIG. 8, and as a result, it may be difficult or impossible to install the motor due to a layout of the belt. However, in the present invention, since the two smaller sized motors with the same capacity are provided, and the planetary gear mechanism may be used as a power transmission mechanism for transmitting power to the engine instead of the belt, the aforementioned problems may be solved, and it may be possible to more easily configure a layout of the belt that is required when other components using the belt transmission mechanism are mounted to the engine.

Figure 9:
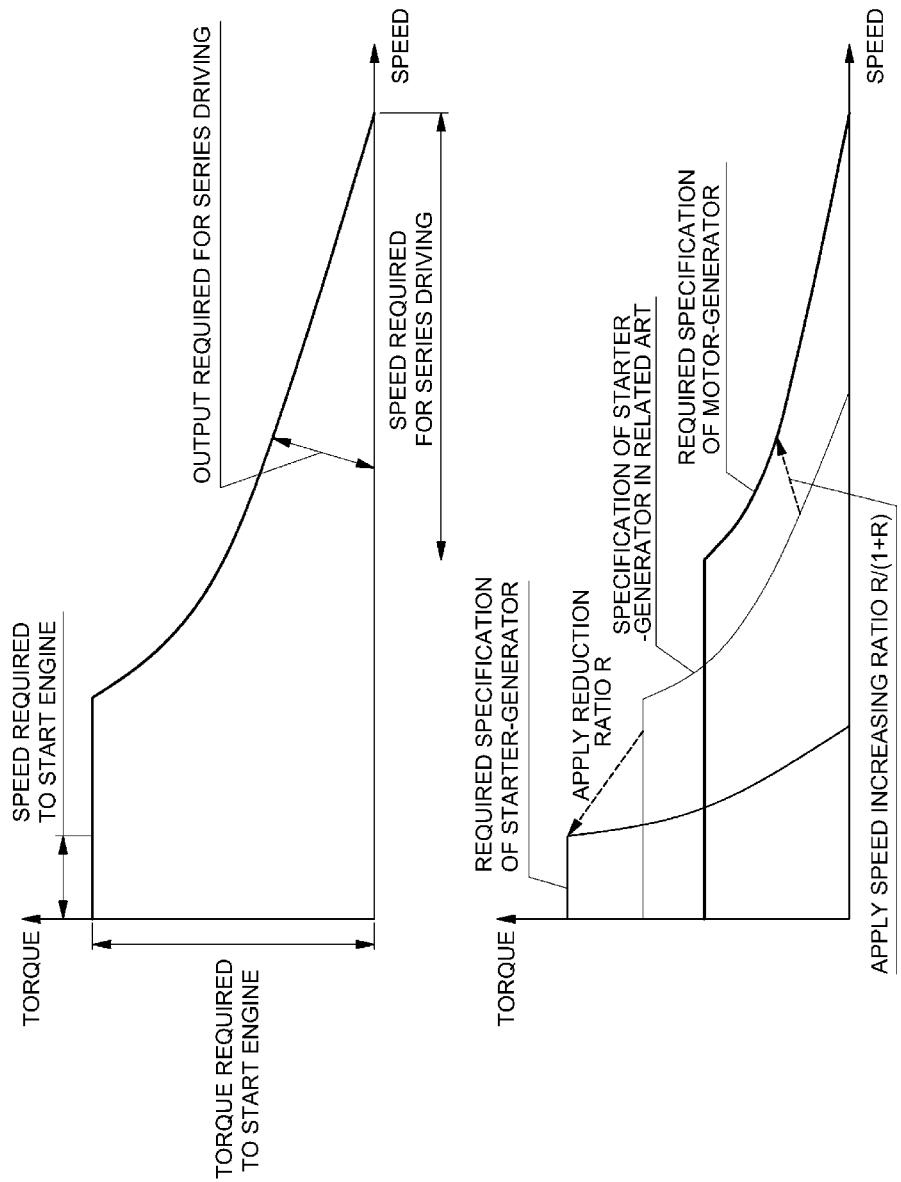

FIG. 9 is another view for explaining effects of the system according to the present invention. In the related art, both a specification required to start the engine and a specification required for the series driving need to be satisfied with a single motor when determining the specification of the motor for starting the engine and generating electric power, and as a result, there is a problem in that even though only one of the two specification requirements is enlarged, the specification of the motor is still excessively enlarged overall.

However, in the present invention, it may be possible to separately cope with a high-torque region and a high-speed region based on a planetary gear ratio by using the two motors (e.g., the starter-generator and the motor-generator) with the same specification as illustrated in FIG. 8, and as a result, it may be possible to reduce material costs and production costs that are incurred due to the use of the large-capacity motor. Particularly, the motor, which has been developed to be used for a small-sized vehicle, may be used for a large-sized vehicle, thereby reducing development costs and material costs.

As illustrated in FIG. 8, since the motor for starting the engine and generating electric power needs to satisfy a total of four specifications regarding a speed 1-1 required to start the engine, a torque 1-2 required to start the engine, output 2-1 required for the series driving, and a speed 2-2 required for the series driving, the specification of the motor may be excessively enlarged.

However, in the present invention, since it is acceptable when the starter-generator 21 satisfies only the specification regarding the torque among the required specifications of the motor, the specification regarding the speed may be significantly decreased, and since it is acceptable when the motor-generator 22 satisfies the specifications regarding the speed and the output, the specification regarding the torque may be significantly decreased.

As described above, according to the present invention, it may be possible to cope with the specification requirements for the large-capacity motor by the two motors with the same specification while using the planetary gear mechanism. Accordingly, the starting and generating system for a hybrid vehicle according to the present invention uses the two small-capacity motors that may be variously operated based on a mode selected from the stopping mode, the engine starting mode, the series driving mode, and the general traveling mode, and may start the engine and generate electric power, and as a result, it may be possible to effectively cope with the requirement for a large-capacity motor and solve a problem regarding a limitation in view of a layout when a single large-capacity motor is applied, or a limitation in application of the large-capacity motor due to an increase in load applied to the shaft of the engine.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A starting and generating system for a hybrid vehicle, configured to start an engine and generate electric power by receiving rotational force of the engine in the hybrid vehicle that includes the engine, a drive motor, and an engine clutch disposed to transmit or block power between the engine and the drive motor, the starting and generating system comprising:

a starter-generator configured to transmit rotational force to the engine to start the engine when the starter-generator is operated as a motor, and is operated as a generator by receiving rotational force of the engine;

a motor-generator operated as a generator by receiving rotational force of the engine;

a planetary gear mechanism which connects the engine, the starter-generator, and the motor-generator to transmit rotational force between the engine, the starter-generator, and the motor-generator;

a first brake and a second brake configured to selectively operate rotating elements connected to the starter-generator and the motor-generator among the rotating elements of the planetary gear mechanism, as a fixed element; and a controller configured to operate the starter-generator, the motor-generator, the first brake, and the second brake.

2. The starting and generating system of claim 1, wherein among the rotating elements of the planetary gear mechanism, a sun gear is connected to a rotating shaft of the starter-generator, a ring gear is connected to a rotating shaft of the motor-generator, and a carrier which integrally couples and supports pinions, is connected to a rotating shaft of the engine.

3. The starting and generating system of claim 2, wherein the controller is configured to output a control signal for, when the engine is started, coupling the second brake connected to the ring gear to operate the ring gear as a fixed element, and a control signal for separating the first brake connected to the sun gear to transmit rotational force of the starter-generator to the engine.

4. The starting and generating system of claim 2, wherein the controller is configured to output a control signal for separating both of the first brake and the second brake when the engine is stopped and the engine clutch is disengaged.

5. The starting and generating system of claim 2, wherein the controller is configured to output a control signal for, when the vehicle is operated using rotational force of the engine and the drive motor when the engine is operated and the engine clutch is engaged, coupling the first brake connected to the sun gear to operate the sun gear as a fixed element, and a control signal for separating the second brake connected to the ring gear to rotate the motor-generator in a no-load state by rotational force of the engine.

6. The starting and generating system of claim 1, wherein the controller is configured to perform a series driving mode control that operates the engine to operate at least one of the starter-generator and the motor-generator, which are selected based on an engine speed, as a generator using rotational force of the engine, and operates the drive motor using generated electric power.

7. The starting and generating system of claim 6, wherein the controller is configured to operate the starter-generator as a generator when the engine speed is a predetermined reference speed or less, and operate both of the starter-generator and the motor-generator as generators when the engine speed exceeds the reference speed.

8. The starting and generating system of claim 7, wherein the controller is configured to output a control signal for operating the first brake and the second brake so that when the engine speed is a predetermined reference speed or lower, a rotating element, which is connected to the starter-generator among the rotating elements of the planetary gear mechanism, is rotated, and a rotating element connected to the motor-generator is operated as a fixed element.

9. The starting and generating system of claim 7, wherein the controller is configured to output a control signal for operating the first brake and the second brake so that when the engine speed exceeds the reference speed, both of the rotating elements connected to the starter-generator and the motor-generator are rotated.

10. The starting and generating system of claim 1, wherein torque supplied to the engine and speed are determined by the planetary gear mechanism based on the following equations, Torque supplied to Engine=$(1+R)$×Starter-generator Torque; and Engine Speed=$1/(1+R)$×Starter-generator Speed, wherein, R indicates a gear ratio (reduction ratio) of the ring gear and the sun gear, that is, the number of teeth of the ring gear/the number of teeth of the sun gear.

\* \* \* \* \*